July 31, 1934.  W. A. JEX  1,968,771
ONE-WAY CLUTCH
Filed April 3, 1933
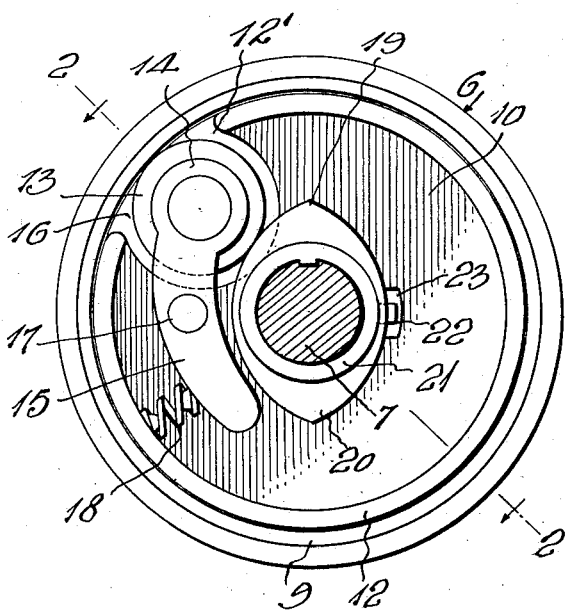
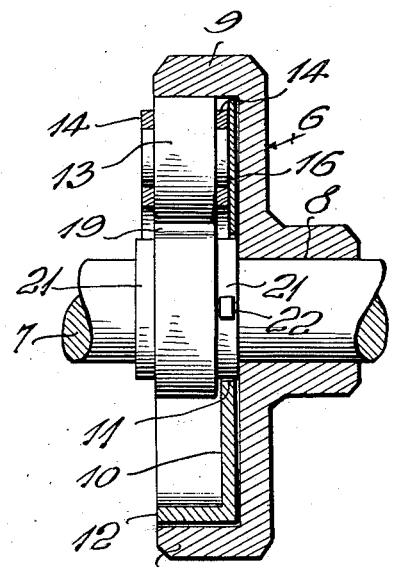
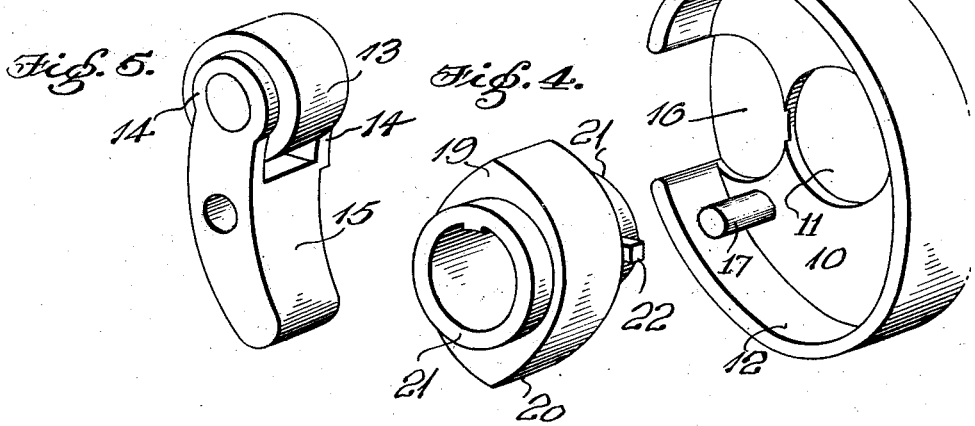
Witness
H. Woodard
Inventor
William A. Jex
By H. B. Wilson &co.
Attorneys.

Patented July 31, 1934

1,968,771

UNITED STATES PATENT OFFICE 1,968,771

ONE-WAY CLUTCH

William A. Jex, Boston, Mass.

Application April 3, 1933, Serial No. 664,252

2 Claims. (Cl. 192—41)

The invention relates to one-way clutches of the general type in which a movable clutch element co-acts with a circular wall, becoming locked with said wall when slight relative rotation of parts occurs in one direction, and becoming unlocked when reverse relative rotation takes place. For purposes of description, the circular wall may be considered as rotatably mounted (as in an oscillatory drive mechanism, or a freewheeling unit), and the shaft may either constitute a driver for the wall, or said wall may constitute a driver for the shaft. By fixing the circular wall against rotation, the same structure may be used to allow rotation of the shaft in but one direction, for instance, to prevent an automobile from drifting rearwardly down hill.

The principal object of the invention is to provide a new and improved clutch in which the movable clutch element is held positively freed from the circular wall by means of one cam, and is held positively engaged with said wall by another cam, the holding of said clutch element disengaged from the wall serving to overcome friction and wear which would otherwise occur.

Another object is to provide a simple and inexpensive, yet an efficient and durable clutch.

With the foregoing in view, the invention resides in the novel subject matter hereinafter described and claimed, description being accomplished by reference to the accompanying drawing.

Fig. 1 is an elevation of a clutch constructed in accordance with the invention.

Fig. 2 is a sectional view on line 2—2 of Fig. 1.

Fig. 3, Fig. 4 and Fig. 5 are detail perspective views of parts hereinafter described.

A preferred construction has been shown and will be specifically explained, with the understanding however, that variations may be made within the scope of the invention as claimed.

The numeral 6 denotes a cup-shaped member which for purposes of description may be considered as rotatably mounted, and 7 refers to a rotatable shaft. The member 6 is provided with a central bearing 8 and with a circular side wall 9 concentric with said bearing. Within this member 6 is a floating carrier 10 which is preferably a circular disk, said carrier having a central opening 11 in axial alinement with the bearing 8. The carrier 10 is, in the present showing, provided with a lateral reinforcing flange 12 of almost circular form, said flange however, being provided with a notch 12′ which accommodates the wall-engaging end of a movable clutch element and exposes a sufficient area of the wall 9 for engagement with said wall-engaging end. In the present showing, the clutch element is a lever 15, whose outer end is equipped with a roller 13. This roller is mounted between furcations 14 of the lever 15, and if desired, one of the furcations may be received in a shallow recess 16 formed in the carrier 10. The lever 15 is fulcrumed between its ends at 17 upon the carrier 10, on an axis parallel with the axis of the bearing 8, and at the end of said lever remote from the roller 13, there may be a coiled compression spring 18 or a spring of other suitable type which acts upon said lever end and re-acts upon the flange 12 so as to rock the lever 15 in the proper direction to yieldably urge the roller 13 toward the circular wall 9.

The shaft 7 passes rotatably through the bearing 6 and is provided with two cams 19 and 20 having a common hub 21 keyed or otherwise secured upon said shaft, one end of said hub being received in the opening 11 in the construction shown. The cam 19 is co-operable with the roller 13 to wedge said roller into engagement with the side wall 9 when the shaft 7 is turned slightly in one direction, and when said shaft is turned in the other direction, the cam 20 is adapted to engage the end of the lever 15 remote from said roller 13, thereby so rocking said lever as to release said roller from engagement with the wall 9 and hold it released as long as the shaft rotates in said other direction. The hub 21 is provided with a radial lug 22 received in an arcuate notch 23 formed in the wall of the opening 11. When shaft 7 turns in a direction to wedge roller 13 into engagement with the wall 9, the lug 22 merely idles within and does not strike an end of the notch 23. When the shaft turns in the other direction however, and effects release of the roller 13, the lug 22 strikes an end of the notch 23 and thus establishes a connection between the shaft and the carrier 10 so that they will rotate bodily. While this specific pick-up means is preferable between the shaft 7 and the carrier 10, other equivalent means might of course be employed.

It will be seen from the above that a novel and advantageous structure has been provided, constituting an effective, simple and reliable one-way clutch, for any of the above mentioned purposes or for a similar purpose, and it will be observed that the movable clutch element (lever 15 and its roller 13) is not only held in engagement with wall 9 by cam action, but is disengaged from and held disengaged from said wall, by additional cam action, so that the clutch will run entirely free when required, overcoming friction and wear which would otherwise occur.

I claim:—

1. A one-way clutch comprising a cup-shaped member having a central bearing and a circular side wall concentric with said bearing, a floating carrier disk within said cup-shaped member and having an opening alined with said bearing, the wall of said opening being provided with a notch, a clutch member and means movably mounting it upon said carrier disk in position to engage said circular side wall, a shaft passing rotatably through the aforesaid bearing and opening and rotatable with respect to said cup-shaped member, a cam secured on said shaft for wedging said clutch member into engagement with said circular side wall when the shaft is turned in one direction and for allowing release of said clutch member when the shaft is turned in the opposite direction, and a radial lug secured on said shaft and received in the aforesaid notch of said carrier disk, said lug and notch being co-operable to effect rotation of said carrier disk with said shaft when said clutch member is released.

2. A one-way clutch comprising a cup-shaped member having a central bearing and a circular side wall concentric with said bearing, a floating carrier disk within said cup-shaped member and having an opening alined with said bearing, said carrier disk having a substantially circular lateral flange within and concentric with said side wall and formed with a notch which inwardly exposes part of said side wall, a lever fulcrumed between its ends on said carrier disk, said lever having its major portion spaced inwardly from said flange and having its outer end disposed within said notch for contact with said side wall, a spring acting on the inner end of said lever and reacting on said flange to urge said outer end of the lever toward said side wall, a shaft passing rotatably through said bearing and said opening, a cam on said shaft to force said outer end of the lever against said side wall upon relative turning of said shaft and side wall in one direction, and a second cam on said shaft adapted to strike the inner end of said lever to release the latter from said side wall upon reverse relative turning of said shaft and side wall.

WILLIAM A. JEX.